Inventor.
William C. Martyny,
by His Attorney.

June 6, 1961 W. C. MARTYNY 2,987,414
TREATMENT OF LUMINESCENT MATERIALS
Filed Dec. 3, 1956 2 Sheets-Sheet 2

Inventor.
William C. Martyny,
by Ernest W. Legree
His Attorney.

United States Patent Office 2,987,414
Patented June 6, 1961

2,987,414
TREATMENT OF LUMINESCENT MATERIALS
William C. Martyny, Lyndhurst, Ohio, assignor to General Electric Company, a corporation of New York
Filed Dec. 3, 1956, Ser. No. 625,942
9 Claims. (Cl. 117—33.5)

This invention relates to the treatment of luminescent materials and more particularly to a method of treating and suspending luminescent materials for application to the envelopes of electric discharge devices such as fluorescent lamps. The instant application is a continuation-in-part of my copending application Method of Treating Luminescent Materials, Serial No. 432,594, filed May 26, 1954, and assigned to the same assignee as the present invention and now abandoned.

Heretofore the commonly used process for coating fluorescent lamp envelopes with phosphors has been to suspend the phosphor in a binder of nitrocellulose in a suitable organic solvent such as butyl acetate. The suspension is introduced into the interior of the tube to be coated, the excess allowed to drain, and the coating dried by passing a current of warm air through the tube. The tube is then lehred, that is heated in an oxidizing atmosphere at a temperature sufficient to decompose and burn out the binder material. The envelope is then ready to be made into a fluorescent lamp by sealing mounted electrodes to its ends, evacuating and then filling with a suitable ionizable filling such as mercury and an inert starting gas.

Nitrocellulose binders have the disadvantages of relatively high cost, inflammability and toxicity. It has been observed that the phosphors cannot be milled to the desired degree of fineness without experiencing a substantial loss in luminous efficiency. The consequent use of coarse suspensions results in a grainy appearance. Also "coating off," a term used to describe the flaking off of the phosphor coating in the finished lamps, may result.

It is possible to obtain some increase in brightness or luminous efficiency of some phosphors by washing them in water or in aqueous solutions prior to suspension in the coating binder. However it has proved impractical to so treat the prepared phosphor prior to suspending in nitrocellulose binders because after such treatment the phosphor must be thoroughly dried before it can be suspended in the organic medium, which requirement would add unduly to the processing cost. In an effort to overcome these problems, aqueous solutions of water-soluble cellulose derivatives have been suggested. In general, these suggestions have proved workable; however other problems have arisen in connection with their use. Many of the water-soluble cellulose derivatives tend to produce a grainy coating of luminescent material, or reduced lumen maintenance. In addition, many of the water-soluble cellulose derivatives will not give a solution of desired viscosity without excessively increasing the solids content. This may prevent complete removal of the organic binder material during lehring, resulting in the formation of brown rings in the luminescent coating. In addition, many of the water soluble binders are difficult to store due to bacterial action.

An object of the invention is to increase the brightness and luminous efficiency of phosphors without deleteriously affecting their adherence to the walls of lamp envelopes upon which they are coated. A closely related object is to improve the appearance and reduce the graininess of phosphor coatings on fluorescent lamps without deleteriously affecting the luminous efficiency of the phosphor.

Another object of the invention is to provide a method of treating luminescent materials in an aqueous binder solution to remove essentially all of its impurities and produce a smooth, densely packed, coating on the surface of the vitreous envelope on which it is coated.

A further object of the invention is to provide a method of treating phosphors which will substantially improve the performance characteristics of electric discharge devices whether the phosphors are suspended in aqueous or non-aqueous binder solutions for application to the lamp envelope.

Still another object is to provide an improved method of treating and suspending phosphor materials in which the cohesive forces between suspended particles are substantially neutralized, preventing the coagulation or flocculation of the particles during treating, storage or application to vitreous surfaces.

In its broad aspects, the invention provides for processing fired phosphor material by milling in an aqueous dispersing medium until agglomerates and particles are reduced in size at least to the extent necessary to provide a smooth coating substantially free of graininess when applied to a vitreous envelope. We have discovered that the particle distribution necessary to produce satisfactory appearance in a finished lamp contains many undesirable particles within the range of effective diameters under one micron. In the process according to the invention, a substantial proportion of these submicron particles are removed. This may be achieved by discarding the supernatant liquid after settling of the larger particles, accelerated if desired by centrifuging. The luminous efficiency of the remaining material is then found to be substantially higher.

In a preferred process in accordance with the invention, a fired phosphor material is treated by milling in a suitable ball or pebble mill a mixture of the phosphor material, water, ammonia, and a copolymer of vinyl methyl ether and maleic anhydride (for convenience, hereinafter designated PVM/MA) until the phosphor particles are reduced to the desired size. The milled mixture is then allowed to settle until all but the phosphor particles in the sub-micron range which it is desired to discard have come out of suspension. Where quiescent settling of the suspension is used, this step may take considerable time; the time may be shortened by centrifuging. The supernatant liquid is then decanted and discarded. The phosphor powder which is now in the form of a cake may be resuspended in an aqueous binder for application to a lamp envelope, or if a non-aqueous cellulose binder is to be used, it is first dried then resuspended. It has been found that phosphor thus treated shows a decided improvement in efficiency and lumen maintenance by comparison with phosphors milled conventionally.

In accordance with a further aspect of the invention which provides additional improvement, after the supernatant liquid has been decanted and discarded, the phosphor powder is reslurried with water, ammonium hydroxide and PVM/MA and agitated, as by milling for example, for a time sufficient to resuspend the luminescent particles for application to the lamp envelope.

For further objects and advantages and for a detailed description of the invention, attention is now directed to the following description and accompanying drawings. The features of the invention believed to be novel will be more particularly pointed out in the appended claims.

In coating fluorescent lamps with luminescent materials or phosphors, it is necessary to mill the phosphor to reduce its particle size in order to achieve the desired smoothness of coating. It has been a generally accepted observation that milling, when unduly prolonged, entails a decrease in luminous efficiency. In a lamp made with an undermilled phosphor, a spotty effect is observed in the coating when the lamp is lighted. A typical spot may consist of a large particle with numerous small particles surrounding it. This spottiness or graininess may be eliminated by milling the phosphor sufficiently to reduce all particles to an effective diameter less than 10 microns for instance. However when this is done in the conventional nitrocellulose-butyl acetate binder, it is found that the luminous efficiency of the phosphor is decreased. Thus, milling of phosphors as practiced up to the present has involved a compromise between the extent of milling necessary to provide a smooth coating and the desirability of avoiding undue reduction in efficiency of the phosphor.

We have discovered that the reduction in efficiency entailed by prolonged milling is due primarily to two factors. The first factor is the release of occluded impurities from the phosphor particles which may coat or attach themselves to other phosphor crystals to reduce their light conversion efficiency. The second factor is that fine phosphor particles of less than a certain critical size have a substantially lower luminous efficiency than larger particles. I have discovered that most of these undesirable fine particles reside in the range of diameters less than one micron, that is in the sub-micron range.

In accordance with the invention, I have discovered that by milling phosphors in suitable dispersing media which will maintain the contaminants and sub-micron particles in suspension, it is possible to remove them by settling of the larger particles, accelerated if desired by centrifuging, and decantation of the dispersing medium containing the undesirable particles. By so doing, a substantial increase in luminous efficiency of the phosphor coating may be realized in a phosphor having the desired smoothness. Various dispersing media may be used for milling and elimination of contaminants and sub-micron particles in accordance with the invention. In general, aqueous dispersing media are preferred inasmuch as the use of an electrolyte facilitates maintaining the impurities and sub-micron phosphor particles in suspension. Suitable aqueous dispersing media are PVM/MA, carboxymethyl cellulose, and ammonium alginate. Of these various materials, PVM/MA is preferred for the various reasons which will appear in the detailed description of a preferred method of practicing the invention which will be described hereinafter.

Figure 3:
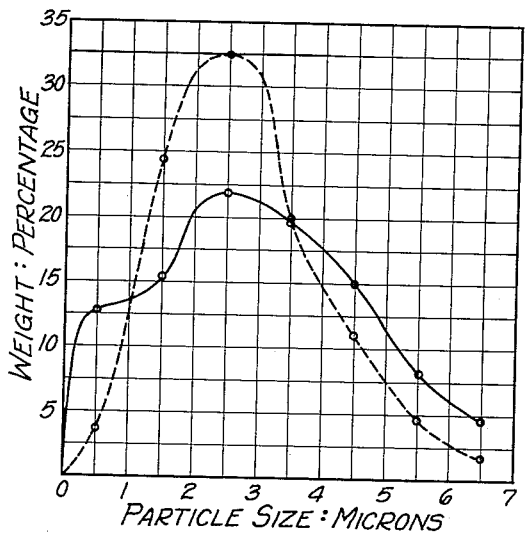
FIG. 3 is a curve illustrative of the particle size distribution in phosphor coatings processed in accordance with the invention.
Figure 1A:
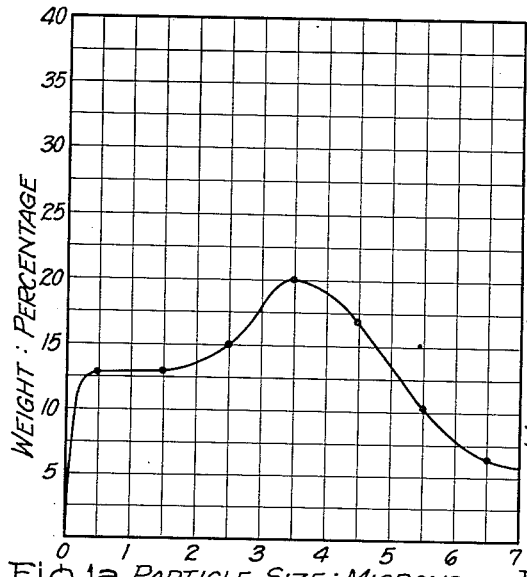
Figure 1B:
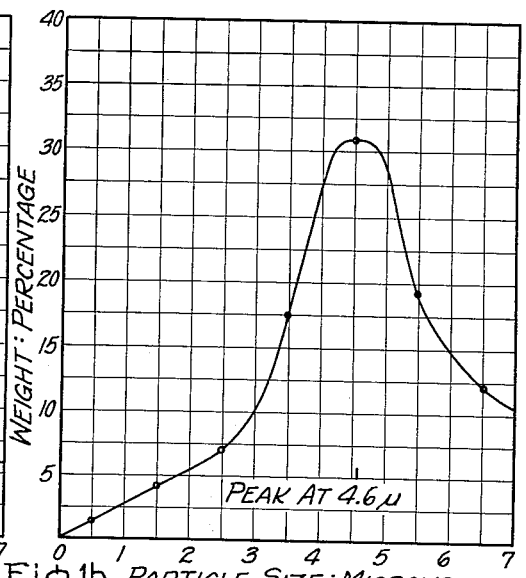
Figure 1C:
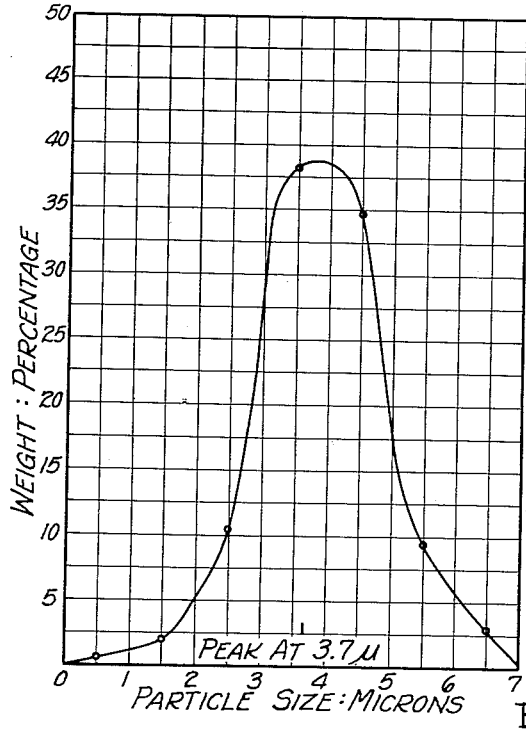
Figure 1D:
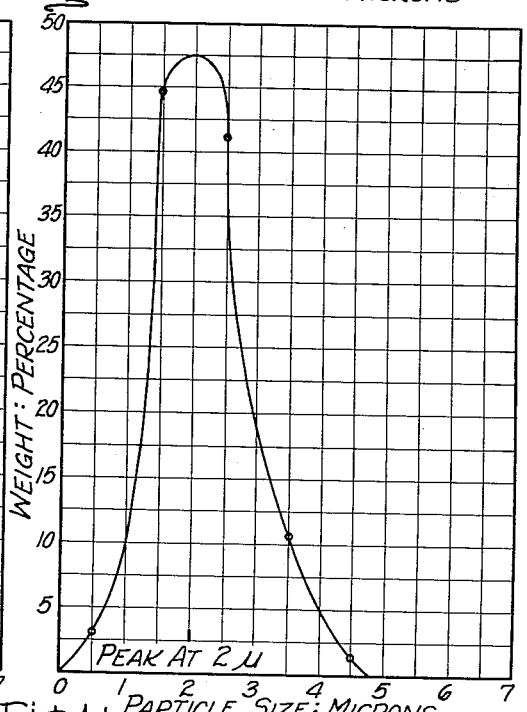

FIG. 1a illustrates the percentage distribution by weight of phosphor particles in the range of effective diameters up to 7 microns obtained from ball milling a calcium halophosphate phosphor. The particle size distribution has been determined by the method described in National Bureau of Standards Research Paper R.P. 757, entitled "Use of Pipette Method in the Fineness Test of Molding Sands," and available from the Superintendent of Documents, U.S. Government Printing Office. Whereas the distributions shown in FIG. 1a, and likewise in FIGS. 1b to 1e and in FIG. 3 are represented as smooth curves, it will be appreciated that the actual determinations consist of cuts of approximately 1 micron width whose relative weights are indicated by the encircled points. The curves merely afford a basis of comparison of the distribution of these points.

It will be observed that FIG. 1a shows a substantial percentage by weight of particles in the region below 1 micron, approximately 13% in this particular sample. FIGS. 1b to 1e illustrate particle size distributions of various samples prepared by selective settling of the sample of FIG. 1a. This may be achieved by placing the unclassified suspension in a settling jar and removing the fractions of phosphor particles which settle during given time intervals, the larger particles settling first and the finer particles settling last in accordance with Stokes' law. By repeated settling, the relatively sharply classified suspensions of FIGS. 1b to 1e were obtained wherein the particle distributions are peaked relatively sharply at 4.6, 3.7, 2.0, and 1.2 microns respectively.

Figure 1E:
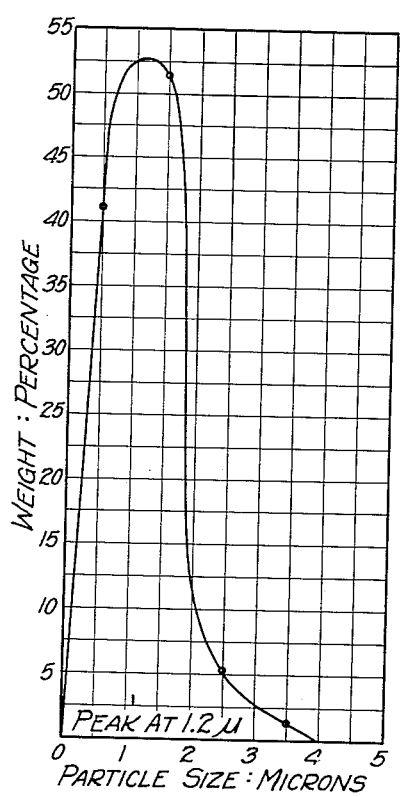
FIGS. 1a to 1e are particle size distribution curves illustrative of the findings underlying the invention.
Figure 2:
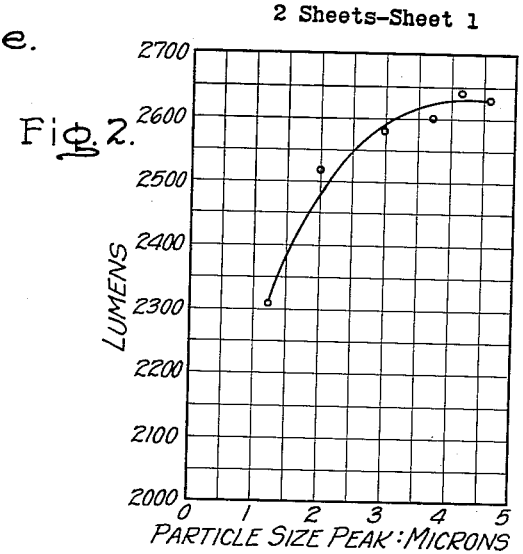
FIG. 2 is a curve showing the variation of lumen output of phosphor coatings with particle size distribution.

Referring to FIG. 2, the curve illustrates the relative luminous efficiency of lamps coated with the classified phosphor suspensions of FIGS. 1b to 1e. It will be observed that the luminous efficiency falls off very sharply with the classified phosphor of FIG. 1e wherein the particle distribution is peaked at 1.2 microns. In this suspension, 41% by weight of the particles are of submicron size; these determinations and numerous others of a similar nature have led to the finding that substantial advantages in coating quality and luminous efficiency may be achieved, contrary to prior beliefs, by prolonged milling provided it be followed by elimination or substantial reduction of fine sub-micron particles.

To take advantage of these findings the invention provides for milling a phosphor suspension until the phosphor particle size is reduced to less than 10 microns, and preferably the distribution falls primarily within the range from 0 to 7 microns, such distribution resulting in substantially over 10% by weight of particles in the sub-micron range. Then by settling or centrifuging, the proportion of fine sub-micron particles is reduced to less than 10% and preferably to 5% or less. A typical suspension, milled and centrifuged in accordance with the invention, is illustrated in FIG. 3 wherein the solid curve illustrates the distribution prior to removal of sub-micron particles, the percentage by weight of sub-micron particles being approximately 13%, and the dotted curve illustrates the distribution after such removal, the percentage by weight of sub-micron particles remaining being approximately 3.5%. It will be appreciated that the settling or centrifuging discriminates against the smallest particles in the sub-micron range by comparison with those close to the 1 micron size. This is advantageous inasmuch as the smallest particles are the most inefficient and the weight of phosphor which must be discarded as a loss is reduced to a minimum. It also has the advantage of providing a suspension with a relatively broad distribution of particle size which has been found necessary for good adherence to the lamp envelope.

The reduction or substantial elimination of sub-micron particles in accordance with the invention has been found effective in increasing luminous efficiency even with nitrocellulose-butyl acetate binders of the kind that have been conventionally used heretofore. In a 40-watt lamp producing approximately 2500 lumens, I have found a gain in lumens of 100 to 200 lumens, depending upon the type of phosphor, through the use of phosphor suspensions with the proportion of sub-micron particles substantially reduced in accordance with the invention.

By way of detailed description of a preferred method of practicing my invention, we preliminarily prepare a charge for a 25-gallon ball mill as follows:

30 kilograms of phosphor material
10 liters of de-ionized water
30 grams of PVM/MA (2.5 to 3.5 specific viscosity grade)
300 cc. of ammonium hydroxide (28% $NH_3$)

These materials may be pre-mixed or introduced into the mill separately. The mixture is then milled, the time of milling varying widely with the type of phosphor used, the size of the mill, the particular phosphor lot, and the ultimate particle size desired. For example, with one lot of a calcium halophosphate phosphor, a milling time of 5 hours produced the desired results. When the milling has been completed, the slurry is then poured into a container along with 15 liters of de-ionized water and allowed to settle for at least 48 hours. When the settling is completed it is found that the phosphor is a clay-like mass in the bottom of the container. The supernatant liquid is removed by decantation and the following materials are added to the phosphor:

10 liters of de-ionized water
150 grams of PVM/MA
30 cc. of ammonium hydroxide (28% $NH_3$)

This mixture is put into a 25-gallon ball mill and mixed for about a half-hour, at which time the suspension is complete. The pH value for the original milling mixture should be maintained at not less than 8 but preferably around 9 to 10, and maintained at that value throughout the milling cycle. The reslurried coating suspension should have a pH value of not less than 8 but preferably around 10 to 10.5 and should also be maintained at that figure during reslurrying and coating of the lamp envelope.

Instead of quiescent settling of the slurry from the original milling mixture over an extended period of time, centrifuging over a much shorter period of time may be used. For instance a suspended solid basket centrifuge of 26 inch diameter rotating at 1800 r.p.m. on a vertical axis may be used. The slurry is supplied to the bottom of the basket at a rate of feed of approximately 3 gallons per minute and the solution containing the sub-micron particles and contaminants flows out through the top, the phosphor being retained as a clay-like mass lining the walls of the basket.

Vinyl methyl ether-maleic anhydride copolymers are linear polymers consisting of alternating methyl vinyl ether and maleic anhydride units. These compounds are fully described in the pamphlet "PVM/MA—A New Water Soluble Polymer," New Product Bulletin No. P–103, issued January 3, 1951, by the Product Development Dept. of General Aniline and Film Corporation. They are available in specific viscosities of 2.5 to 3.5 for the higher viscosity grade, and 1.21 to 1.25 for the lower viscosity grade. The specific viscosity is defined as the viscosity of a solution of a given concentration in grams per 100 milliliters, minus the viscosity of the solvent divided by the viscosity of the solvent. In this case the specific viscosity is computed on the basis of 1 gram per 100 milliliters of PVM/MA in 2-butanone at 25° C. Low solids content is desirable in any temporary binder solution, so that the solids may be easily removed after the coating has dried. Thus, the higher specific viscosity grades are preferable since they will produce a binder solution of a suitable viscosity for lamp coating at a low solids content. For example, only half as much PVM/MA of 2.5 specific viscosity grade is required by comparison with PVM/MA of 1.25 specific viscosity grade; for instance, 0.5% by weight of the former as against 1% by weight of the latter. However, the lower viscosity grades have successfully been used without encountering difficulty in removing the additional solids from the coating.

The amounts of the prescribed materials may be varied widely while still achieving the desired results. For example, we have found that in the initial charge we may use from 2000 to 3000 parts by weight phosphor material, 1000 to 4000 parts by weight of water, 3 to 20 parts by weight of PVM/MA, and 3 to 100 parts by weight of ammonium hydroxide (concentrated, i.e., 28% $NH_3$). The preferred amounts in the initial charge are:

3000 parts by weight phosphor material
1200 parts by weight water
6 parts by weight PVM/MA
30 parts by weight of ammonium hydroxide (concentrated)

In reslurrying the phosphor material to prepare the coating suspension, one may use from 1000 to 5000 parts by weight of water, from 9 to 40 parts by weight of PVM/MA and from 9 to 100 parts by weight of ammonium hydroxide. The preferred coating suspension is usually composed of 3000 parts by weight of water, 15 parts by weight PVM/MA and about 20 parts by weight of ammonium hydroxide (concentrated).

The milling time may vary widely with varying conditions such as the speed and size of the mill and the phosphor type and lot. As an example of a variation in milling time with various phosphor materials, we have found that with constant mill size and speed the following phosphors require the times indicated:

| | Hours |
|---|---|
| Calcium halophosphate activated with antimony and 1.2% manganese (white) | 6 |
| Calcium halophosphate activated with antimony and 0.8% manganese (cool while) | 5 |
| Zinc silicate | 1 |
| Calcium silicate | 6 |

As an example of milling time variation with size and speed of the mill, we have found the following results: in a one quart pebble mill at 120 revolutions per minute, the desired particle size is achieved in 1½ hours. In a one-gallon pebble mill at 50 revolutions per minute, 6 hours are required to achieve the same particle size. In a 25-gallon pebble mill at 40 revolutions per minute, 5 hours are required, and in a 100-gallon pebble mill at 33 revolutions per minute, 4 hours are required. The desired particle size mentioned previously encompasses a range of particle size distribution from about 1 to 5 microns, the peak distribution occurring at about 2 to 3 microns.

Previously, due to the known deleterious effect of prolonged milling on the luminescent efficiency of the phosphors, it was necessary to compromise between relatively coarse phosphors of higher brightness but entailing graininess and tendency to flake off, and fine phosphors of lower brightness. Milling and elimination of contaminants including sub-micron particles in accordance with the present invention eliminates the necessity for such a compromise and provides considerably improved results.

Prolonged milling in the preferred water-ammonia-PVM/MA system according to the present invention is particularly effective inasmuch as the phosphor particles are broken up to a very small size exposing fresh surfaces and occluded impurities which are then dissolved in the water-ammonia system. As this system becomes saturated with impurities, it naturally will not dissolve any more from the freshly exposed phosphor surfaces or some impurities will be precipitated from the saturated solution and immediately adsorbed on the phosphor particle; thus the ammonia-water-impurity solution would have to be removed and fresh ammonia and water added to dissolve additional impurities. However, the PVM/MA precipitates the impurities from the ammonia-water solution and causes them to go into a fine colloidal suspension, thus enabling the ammonia and water to dissolve more impurities from freshly exposed phosphor surfaces. The debris from milling consisting of the impurities previously mentioned, minute flakes from the pebbles of the mill, contamination from prior mill charges, and extremely fine pieces of phosphor crystals enter along with the phosphor impurities into the colloidal suspension and the decanting operation after settling or centrifuging consequently removes essentially all debris and impurities.

Prior processes also encountered severe flocculation when phosphor particles were too finely broken up in the mill, rendering it difficult and many times virtually impossible to continue the milling operation. Flocculation in the milling charge and coating suspension of my invention is essentially eliminated by the action of the ammonium hydroxide present. As the phosphor agglomerate is broken up, the negatively charged particles are immediately coated by ammonia ($NH_4^+$) which renders these particles neutral. The hydroxyl radical ($OH^-$) acts to clean up the phosphor still further by attracting cations which then very likely are dissolved in the milling solution. The PVM/MA, in addition to its function of precipitating debris and impurities from the ammonia-water solution, so that this solution may dissolve more impurities rather than their being re-adsorbed on the phosphor particles, also acts as a cushion, that is a lubricant and impact reducing agent, during the milling operation preventing the formation or the pickup of additional debris. The phosphor particles are then allowed to settle and the supernatant liquid containing the colloidally suspended debris, including very minute pieces of phosphor crystals, is then decanted. These minute fragments of phosphor crystals are known as phosphor fines and have in the past been considered harmful to phosphor coatings.

It will be noted that after the decantation of the colloidal suspension, the phosphor powder may be dried and suspended in nitrocellulose or other known binder. Since the phosphor particles have already been reduced to the desired small size, and the debris and impurities thoroughly removed, lamps coated with this phosphor suspension in nitrocellulose, for example, will show considerable improvement in initial lumen output over lamps coated with untreated phosphors suspended in nitrocellulose.

However, still further improvements are obtained by re-suspending the treated phosphor in a solution of ammonium hydroxide, water and PVM/MA. It is advisable to suspend the phosphors in the same material in which they were milled, thus achieving a more compatible system and, in addition, there is also the continuation of the sleeving action of the ammonia preventing the adsorption of impurities on the phosphor surfaces. By contrast with the use of a nitrocellulose binder, there will be no nitrates left in the finished coating which impair the life of the lamp and increase the required starting voltage; the drying step preparatory to suspending in nitrocellulose is eliminated and a completely clean phosphor makes up the luminescent coating.

The phosphor particles may be re-slurried in the water, ammonium hydroxide and PVM/MA binder solution by any well-known means of agitation, but the usual method is to remill for about ½ hour until suspension is complete.

Phosphors milled according to the disclosed process, and dried and suspended in the conventional cellulosic binder such as nitrocellulose, showed a gain of better than 100 lumens in a 40-watt lamp after 100 hours of operation, and the maintenance at 500 hours increased about 3% over the usual nitrocellulose-suspended, phosphor coated lamps. Tests on lamps coated with phosphors which have been milled and suspended according to the disclosed process show a gain at 100 hours of more than 6% (150 lumens) of initial output; after 500 hours of operation the lumen output is 9% better than that of lamps coated with untreated phosphors suspended in nitrocellulose, and at 3000 hours the maintenance has improved 20%. Further, the long milling of the phosphor materials not only produces the advantages previously mentioned but allows the weight of phosphor required to achieve maximum brightness in a lamp coating to be reduced by at least 25%, and many times as high as 40%, depending upon the phosphor material used. The "coating-off" difficulties encountered in lamp manufacture are practically eliminated. This is due to the fact that the binder (PVM/MA) migrates to the surface of the phosphor coating during drying and as a result the phosphor particles can pack and sinter more tightly, and also due to the fact that the phosphor is finer and consequently has less weight. Lamps coated with a suspension prepared as described show much improved appearance over lamps coated with other water-soluble materials or the standard cellulosic binders. There is no "buttermilk" condition, the coating is even from top to bottom of the lamp eliminating the thin top end, and there are no floccules. The cost of materials used for suspending the phosphors in water-soluble PVM/MA suspensions is found to be about 1% of the cost of materials for the usual nitrocellulose suspension.

It will be noted that simple washing of the phosphor materials with water, ammonium hydroxide and PVM/MA, either prior to milling or after milling, will not produce the desired results. Washing with any solvent will merely remove the impurities already exposed on the surface of the phosphor particles and it is necessary to reduce the size of the phosphor agglomerates in the presence of the aforesaid solution so that the fresh phosphor surfaces may be immediately cleaned by the action of the PVM/MA, water and ammonia system. Nor will suspending of an untreated phosphor in the PVM/MA, ammonia and water system produce the desired result. It would be extremely difficult to reduce the phosphor agglomerates to the desired size unless the milling was carried on in a suitable system such as PVM/MA, due to the rapid flocculation which would occur. Thus, the phosphor surfaces would not be exposed to the same degree enabling the system to reach and remove occluded impurities.

The copolymer of methyl vinyl ether and maleic anhydride used in the process is obtainable as an anhydrous powder which can be dissolved readily in hot water giving a clear colorless liquid. The ratio of solid binder material to the phosphor is the same as for the usual nitrocellulose binders, that is, about 0.5% by weight. The coating suspension is preferably kept above a pH value of 10. This is accomplished by adding ammonium hydroxide. The PVM/MA is quite stable; there is no reduction of viscosity on storing and no attack by microorganisms in stored binder solutions or phosphor suspensions of PVM/MA.

The coated bulbs are dried by passing hot air axially downward through the tube until all the water vapor is removed. I have found that the drying operation may be conducted very rapidly without creating any appearance problems.

PVM/MA has a unique characteristic in that its viscosity varies with pH value. A simple curve is formed with increasing pH value as follows: Below a pH of about 7 the viscosity drops off rapidly to minimum and above a pH of about 9 the viscosity drops off rapidly again to minimum at about 11 pH. The curve would be fairly flat at the top portion showing a maximum viscosity between about 7 and 9 or at a pH of 8. It is possible to take advantage of this characteristic by adjusting the pH value of the coating suspension high at a value above 10 or 10.5. As soon as the hot air passes through the bulb in the drying cycle, ammonia is lost and the pH is lowered thus increasing the viscosity. This makes it possible to avoid thin top ends and achieve the same coating thickness throughout the lamp. In other words, as the bulb is dried the pH is reduced from the high side and the viscosity increases steeply, thus preventing draining or thinning of the coating at the top of the bulb. If a high ambient temperature surrounds the bulb during drying, almost all of the binder is driven from the bulb wall and is to be found on the inside surface of the coating material. The selective adsorption of ammonia around the phosphor particles in preference to the binder material prevents the formation of a sleeve of binder around the phosphor particles. It is this condition that enables the binder to migrate to the surface of the phosphor coating and, as a result, the burnout or lehring of the binder is accomplished much more easily. It will also be evident that the finer phosphors will not be more difficult to lehr, as has been true in the past, because the organic binder is fully exposed to the oxygen of the air and not protected by an often densely packed phosphor film. This is another factor which enables a longer milling cycle producing a finer, more densely packed phosphor coating. Still another advantage is that it would be possible to remove part if not all of the binder from the dried bulb coating by passing a flow of water through the bulb after drying, thus eliminating any necessity for a prolonged lehring period.

Although a preferred embodiment of my invention has been disclosed, it is recognized that variations and changes may be made therein within the spirit and scope of the invention as defined by the appended claims. It is understood particularly that the ingredients, their proportions and concentrations and treatment time can be varied, independently and in relation to each other, within fairly wide limits to obtain the desired results.

What I claim as new and desire to secure by Letters Patent of the United States is:

1. The method of treating a finely divided inorganic luminescent material which comprises preparing a mixture of said luminescent material, water, ammonium hydroxide and a copolymer of methyl vinyl ether and maleic anhydride, said mixture having a pH value of at least about 8, milling said mixture for a time sufficient to reduce the luminescent particles to the ultimate size desired while maintaining the said pH value throughout, allowing the luminescent particles to settle, and separating and discarding the supernatant liquid.

2. The method of treating a finely divided inorganic luminescent material which comprises preparing a mixture of 2000 to 3000 parts by weight luminescent material, 1000 to 4000 parts by weight water, 3 to 100 parts by weight ammonium hydroxide and 3 to 20 parts by weight of a copolymer of methyl vinyl ether and maleic anhydride, said mixture having a pH value of at least about 8, milling said mixture for a time sufficient to reduce the luminescent particles to the ultimate size desired while maintaining the said pH value throughout, allowing the luminescent particles to settle, and separating and discarding the supernatant liquid.

3. The method of treating a finely divided inorganic luminescent material which comprises preparing a mixture of about 3000 parts by weight luminescent material, about 1200 parts by weight water, about 30 parts by weight ammonium hydroxide and about 6 parts by weight of a copolymer of methyl vinyl ether and maleic anhydride said mixture having a pH value of about 9 to 10½, milling said mixture for a time sufficient to reduce the luminescent particles to the ultimate size desired while maintaining the said pH value throughout, allowing the luminescent particles to settle, and separating and discarding the supernatant liquid.

4. The method of coating a glass lamp envelope with finely divided inorganic luminescent materials which comprises preliminarily treating the materials by preparing a mixture of said luminescent materials, water, ammonium hydroxide and a copolymer of methyl vinyl ether and maleic anhydride said mixture having a pH value of at least about 8, milling said mixture for a time sufficient to reduce the phosphor particles to the ultimate size desired while maintaining said pH value throughout, allowing the phosphor particles to settle, separating and discarding the supernatant liquid, reslurrying the luminescent materials with water, ammonium hydroxide and a copolymer of vinyl methyl ether and maleic anhydride, agitating for a time sufficient to re-suspend the luminescent particles, flowing the resulting suspension over the surface of said envelope, drying the coating so formed, and heating to expel the said copolymer.

5. The method of coating a glass lamp envelope with finely divided inorganic luminescent materials which comprises preparing a mixture of 2000 to 3000 parts by weight luminescent material, 1000 to 4000 parts by weight water, 3 to 100 parts by weight ammonium hydroxide and 3 to 20 parts by weight of a copolymer of methyl vinyl ether and maleic anhydride said mixture having a pH value of at least about 8, milling said mixture for a time sufficient to reduce the phosphor particles to the ultimate size desired while maintaining said pH value throughout, allowing the phosphor particles to settle, separating and discarding the supernatant liquid, reslurrying the luminescent materials with 1000 to 5000 parts by weight water, 9 to 100 parts by weight ammonium hydroxide, and 9 to 40 parts by weight of a copolymer of vinyl methyl ether and maleic anhydride, agitating for a time sufficient to re-suspend the luminescent particles, flowing the resulting suspension over the surface of said envelope, drying the coating so formed, and heating to expel the said copolymer.

6. The method of coating a glass lamp envelope with finely divided inorganic luminescent materials which comprises preparing a mixture of about 3000 parts by weight luminescent material, about 1200 parts by weight water, about 30 parts by weight concentrated ammonium hydroxide and 6 parts by weight of a copolymer of methyl vinyl ether and maleic anhydride said mixture having a pH value of about 9 to 10½, milling said mixture for a time sufficient to reduce the phosphor particles to the ultimate size desired while maintaining said pH value throughout, allowing the phosphor particles to settle, separating and discarding the supernatant liquid, reslurrying the luminescent material with about 3000 parts by weight water, about 20 parts by weight concentrated ammonium hydroxide and about 15 parts by weight of a copolymer of vinyl methyl ether and maleic anhydride, agitating for a time sufficient to re-suspend the luminescent particles, maintaining the pH value of the reslurried suspension at about 10 to 10½, and flowing the resulting suspension over the surface of said envelope, drying the coating so formed, and heating to expel the said copolymer.

7. The method of coating a glass lamp envelope with finely divided inorganic luminescent material which comprises suspending the said material in a binder solution of water, ammonium hydroxide and a copolymer of vinyl methyl ether and maleic anhydride in proportions to provide a viscosity suitable for flowing onto said envelope, flowing the suspension over the surface of said envelope, drying the coating so formed, and heating to a temperature and for a time sufficient to expel the binder solids.

8. The method of coating a glass lamp envelope with finely divided inorganic luminescent material which comprises suspending the said material in a binder solution of water, ammonium hydroxide and a copolymer of vinyl methyl ether and maleic anhydride in proportions of about 2000 to 3000 parts by weight luminescent material, 1000 to 5000 parts by weight water, 9 to 100 parts by weight ammonium hydroxide, and 9 to 40 parts by weight of the said copolymer, flowing the suspension over the surface of said envelope, drying the coating so formed, and heating to a temperature and for a time sufficient to expel the binder solids.

9. The method of coating a glass lamp envelope with finely divided inorganic luminescent material which comprises suspending the said material in a binder solution of water, ammonium hydroxide and a copolymer of vinyl methyl ether and maleic anhydride in proportions of about 3000 parts by weight luminescent material, about 3000 parts by weight water, about 20 parts by weight concentrated ammonium hydroxide and about 15 parts by weight of the said copolymer, flowing the suspension over the surface of said envelope, drying the coating so formed, and heating to a temperature and for a time sufficient to expel the binder solids.

References Cited in the file of this patent

UNITED STATES PATENTS

| | | |
|---|---|---|
| 2,297,048 | Britten et al. | Sept. 29, 1942 |
| 2,312,229 | Anderson | Feb. 23, 1943 |
| 2,421,979 | Bachmann et al. | June 10, 1947 |
| 2,756,163 | Herrick et al. | July 24, 1956 |